2,970,114

STABILIZED AQUEOUS SOLUTIONS OF SODIUM BOROHYDRIDE

Robert W. Bragdon, Marblehead, Mass., assignor to Metal Hydrides Incorporated, Beverly, Mass., a corporation of Massachusetts No Drawing. Filed Jan. 27, 1958, Ser. No. 711,154

4 Claims. (Cl. 252—188)

This invention relates to sodium borohydride and more particularly to novel compositions comprising aqueous solutions of sodium borohydride in which the sodium borohydride is stable or substantially stable over long periods of time even at temperatures higher than those encountered during the hottest summer days.

The United States patent to Schlesinger and Brown No. 2,534,533 describes the preparation of sodium borohydride by reacting sodium hydride with methyl borate, the reaction being illustrated by the equation:

(1)   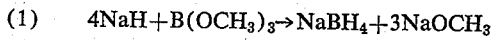
$$4NaH + B(OCH_3)_3 \rightarrow NaBH_4 + 3NaOCH_3$$

The sodium borohydride can be separated from the sodium alkoxide by extraction with a solvent for sodium borohydride which is a non-solvent for the sodium alkoxide, such as isopropylamine. Solid sodium borohydride can be obtained by removing the volatile solvent from the sodium borohydride solution.

Sodium borohydride is useful for reducing or hydrogenating many organic compounds, such as aldehydes, ketones, acid halides, etc. An important advantage of sodium borohydride is that many of these reductions can be effected using a dilute aqueous solution of sodium borohydride.

It has been known for several years that sodium borohydride is soluble in water but decomposes rapidly in aqueous solution. It also has been known that the rate of decomposition decreases with increase in the pH of the aqueous solution. The investigations of Erik H. Jensen, Nyt Nordisk Forlag, Arnold Busck, Copenhagen (1954), show that 9.21 percent, 6.52 percent and 3.75 percent of the sodium borohydride dissolved in 0.10 N, 0.25 N and 1.00 N aqueous solutions of sodium hydroxide decomposes respectively at 24° C. in 4 days. Jensen also shows that the decomposition rate is radically higher at a higher temperature. Thus, Jensen shows that 50.06 percent of the sodium borohydride dissolved in a 1.00 N aqueous solution of sodium hydroxide decomposes at 47° C. in 4 days.

The present invention is based upon the conception that if sufficient sodium hydroxide could be dissolved in an aqueous sodium borohydride solution to obtain a solution in which the sodium borohydride was stable or substantially stable over long periods of time at high temperatures, the resulting solution would posses great utility, for example, (1) it could be shipped safely to points distant from its place of manufacture, (2) after dilution with water or other sodium borohydride solvent which is miscible with water, it could be used for many of the purposes for which sodium borohydride in solid form is used, (3) it could be stored safely for long periods of time until needed for use, and (4) it could be produced at a cost considerably lower than the cost for producing solid sodium borohydride.

Subsequent investigations confirmed the above conception. Determinations for decomposition of the sodium borohydride in an aqueous solution containing 12.9 percent of sodium borohydride and 46.9 percent by weight of sodium hydroxide held at a temperature of 21° C. for 74 days showed decomposition at the rate of only 0.0000003 percent per day. The rates of decomposition of sodium borohydride in aqueous solutions at 21.0° C. containing different amounts by weight of sodium hydroxide and sodium borohydride are shown in the following Table 1.

TABLE 1

| Percent NaOH | Percent NaBH$_4$ | Percent Decomposition Per Day |
|---|---|---|
| 1 | 0.27 | 0.545 |
| 5 | 1.34 | 0.233 |
| 10 | 2.68 | 0.0783 |
| 10 | 10.00 | 0.0538 |
| 20 | 5.35 | 0.00538 |
| 30 | 8.02 | 0.00020 |
| 35 | 9.35 | 0.000038 |
| 40 | 11.00 | 0.000005 |
| 46.9 | 12.9 | 0.0000003 |

The last solution of the above table is substantially saturated with both sodium hydroxide and sodium borohydride at the temperature of the tests. My investigations indicate that, while the concentration of sodium borohydride has some effect upon the stability of the solution, the predominating influence is exerted by the concentration of the sodium hydroxide.

The rate of decomposition of sodium borohydride in aqueous solutions of sodium hydroxide and sodium borohydride is higher at higher temperatures but follows the same pattern as the decomposition rates at 21.0° C. The rates of decomposition of sodium borohydride at 54.0° C., which is higher than any temperature likely to be encountered during shipping, in aqueous solutions containing different amounts of sodium hydroxide and sodium borohydride are shown in the following Table 2.

TABLE 2

| Percent NaOH | Percent NaBH$_4$ | Percent Decomposition Per Day |
|---|---|---|
| 35.0 | 5.00 | 0.00215 |
| 35.0 | 9.35 | 0.0021 |
| 40.0 | 11.00 | 0.00045 |
| 46.9 | 12.9 | 0.0002 |

The preferred compositions of the invention may be prepared by reacting sodium hydride with methyl borate as illustrated by Equation (1) above to form a reaction mixture of sodium borohydride and sodium methoxide. When this reaction mixture is treated with water, the sodium methoxide is converted to sodium hydroxide and methanol as illustrated by the equation:

(2)   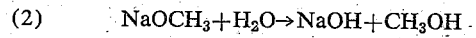
$$NaOCH_3 + H_2O \rightarrow NaOH + CH_3OH$$

Thus, when the reaction mixture is treated with sufficient water to dissolve the sodium borohydride and convert the sodium methoxide to sodium hydroxide and methanol, a solution is obtained consisting of water and methanol containing sodium borohydride and sodium hydroxide dissolved therein. If an excess of sodium hydride is used in producing the reaction mixture it is converted by water to sodium hydroxide and hydrogen gas. By removing methanol from this solution by evaporation, an aqueous solution is obtained consisting essentially of water containing sodium borohydride and sodium hydroxide dissolved therein.

The amount of sodium hydroxide and sodium borohydride contained in the aqueous solution obtained as above described depends upon the amount of water used for dissolving the reaction mixture and to a lesser extent upon the amount of water removed with methanol during the above mentioned evaporation step. Usually, the aqueous solution thus obtained contains about 40 percent of sodium hydroxide and about 11 percent of sodium borohydride, both by weight. It is preferred to control the amount of water so that the amount of sodium hydroxide in the solution is not less than about 35 percent by weight in which case the solution contains about 9.35 percent of sodium borohydride. It is possible to produce an aqueous solution as described above containing maximum amounts of about 46.9 percent sodium hydroxide and 12.9 percent sodium borohydride by weight.

Other aqueous solutions of sodium borohydride and sodium hydroxide of the invention may be produced in which the ratio of sodium borohydride to sodium hydroxide is different from that in the aqueous solutions produced as above described. Thus, an aqueous solution obtained as above described can be treated with potassium hydroxide to precipitate a portion of its sodium borohydride content as potassium borohydride as illustrated by the equation:

(3) 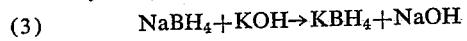  NaBH$_4$+KOH→KBH$_4$+NaOH

The aqueous solution obtained after removal of the potassium borohydride contains a smaller amount of sodium borohydride and a larger amount of sodium hydroxide. In place of potassium hydroxide other salts of potassium, such as the acetate, iodide, bromide or alkoxide, may be used to precipitate potassium borohydride as described in the United States Patent No. 2,720,444 but in such cases the aqueous solution of sodium borohydride and sodium hydroxide will contain a small amount of the sodium salt corresponding to the potassium salt used. The presence of such sodium salts as impurities is not objectionable for most of the subsequent uses of the aqueous solution of the invention.

Aqueous solutions of the invention also may be produced by dissolving in water desired amounts of preformed solid sodium borohydride and preformed solid sodium hydroxide. This method is not recommended on account of its increased cost.

In its broad aspect, the invention contemplates aqueous solutions consisting essentially of water, sodium borohydride and not less than about 35 percent by weight of sodium hydroxide. In such solutions the minimum concentration of sodium borohydride is not critical but a concentration of sodium borohydride of substantially less than 5 percent by weight usually is not practical or economical. The preferred composition consists essentially of water containing about 40 percent of sodium hydroxide and about 11 percent of sodium borohydride each by weight dissolved therein.

The compositions of the invention are sufficiently stable to be stored and shipped using methods common to the liquid caustic industry. The compositions can be substituted for many applications where anhydrous sodium borohydride has been used. A notable exception is the use where the presence of water can not be tolerated; for example, the preparation of diborane. In general, the presence of the sodium hydroxide does not cause undue side reactions in the reduction of carbonyl compounds. In the reduction of alkali-sensitive carbonyl compounds, it is advantageous to conduct the reaction at ice water temperature, or to neutralize the free caustic with the salt of a weak acid such as sodium bicarbonate or borax, or to add the aqueous solution of sodium borohydride and sodium hydroxide to a solution of the carbonyl compound buffered with sodium bicarbonate.

The use of the composition of the invention is illustrated by the following specific examples.

*Example 1*

116 grams of acetone diluted with 250 ml. of water were placed in a 3 liter flask equipped with a thermometer, dropping funnel, reflux condenser and stirrer. 190 grams of an aqueous solution containing 11 percent of sodium borohydride and 40 percent of sodium hydroxide diluted with 150 ml. of water were added over a period of 30 minutes. The reaction mixture was acidified by the addition of 300 ml. of 20 percent hydrochloric acid and the hydrogen evolution measured. The hydride consumed in the reaction was calculated from the amount of hydrogen evolved. Exactly the proper stoichiometric amount was used up prior to acidification. The mixture was distilled through a packed column to collect the isopropanol-water azeotrope. This was dried over calcium sulfate to yield pure isopropanol having a boiling point of 80.8° C. The yield was 83 percent of theory.

*Example 2*

190 grams of an aqueous solution containing 11 percent of sodium borohydride and 40 percent of sodium hydroxide diluted with 400 ml. of water were placed in a 3 liter flask equipped with a stirrer, dropping funnel, thermometer and reflux condenser. A wet test meter was attached to the reflux outlet to permit measure of gas evolution. 144 grams of butyraldehyde were added gradually to the reaction mixture. 6.0 liters of hydrogen gas were evolved during the 30 minute addition period and a subsequent 2 hour reaction time. The solution was acidified with 200 ml. of 20 percent hydrochloric acid and 0.7 liter of hydrogen gas was evolved. The calculated yield, based on sodium borohydride consumed, was 98 percent. 200 grams of sodium chloride were added and the mixture extracted with three 100 ml. portions of ether. The combined ether layers were dried over calcium sulfate and distilled to recover 102 grams of butanol having a boiling point of 117° C. This corresponds to a yield of 69 percent.

*Example 3*

132 grams of cinnamaldehyde and 600 ml. of water were placed in a 3 liter flask equipped with a stirrer, thermometer, dropping funnel and reflux condenser. 145 grams of an aqueous solution containing 11 percent of sodium borohydride and 40 percent of sodium hydroxide were added slowly to the mixture kept near 0° C. with an ice bath. The mixture was allowed to warm to room temperature and the product separated as a thick, oily liquid. The product was withdrawn from the water layer and purified by distillation. The fraction collected at 100°–112° C. at 4 mm. of Hg weighed 113 grams. The yield was 84 percent of theory.

*Example 4*

138 grams of cinnamaldehyde was placed in a reaction flask and cooled to 0° C. Then, 1500 ml. of water was added along with 86 grams of sodium bicarbonate. 95 grams of an aqueous solution containing about 11 percent of sodium borohydride and 40 percent of sodium hydroxide was added over a thirty minute period. The solution was allowed to warm to room temperature during the next 1½ hours. The reaction mixture was worked up by distillation to obtain an 81 percent yield of cinnamyl alcohol.

*Example 5*

95 grams of an aqueous solution containing about 11 percent of sodium borohydride and 40 percent of sodium hydroxide was placed in a reaction flask with 1500 ml. of distilled water and 77 grams of sodium bicarbonate were added. Then, 138 grams of cinnamaldehyde were added over a thirty minute period followed by agitation for the next 1½ hours. The reaction mixture was worked up by distillation to obtain an 84 percent yield of cinnamyl alcohol.

I claim:

1. A reducing composition consisting of water, sodium borohydride and at least about 35 percent of sodium hydroxide by weight based upon the weight of the composition, said sodium borohydride and sodium hydroxide being dissolved in said water.

2. A reducing composition consisting of water, at least about 5 percent by weight of sodium borohydride and at least about 35 percent by weight of sodium hydroxide based upon the weight of the composition, said sodium borohydride and sodium hydroxide being dissolved in said water.

3. A reducing composition consisting of water, about 11 percent by weight of sodium borohydride and about 40 percent by weight of sodium hydroxide based upon the weight of the composition, said sodium borohydride and sodium hydroxide being dissolved in said water.

4. A reducing composition consisting of water, from about 9.35 to 12.9 percent by weight of sodium borohydride and from about 35 to 46.9 percent by weight of sodium hydroxide based upon the weight of the composition, said sodium borohydride and sodium hydroxide being dissolved in said water.

References Cited in the file of this patent

UNITED STATES PATENTS

| | | |
|---|---|---|
| 2,720,444 | Banus | Oct. 11, 1955 |
| 2,741,540 | Bragdon et al. | Apr. 10, 1956 |
| 2,765,312 | Gould | Oct. 2, 1956 |
| 2,766,760 | Bogaty et al. | Oct. 16, 1956 |
| 2,856,260 | Bragdon | Oct. 14, 1958 |
| 2,856,274 | Vetrano et al. | Oct. 14, 1958 |
| 2,901,333 | Bragdon | Aug. 25, 1959 |

FOREIGN PATENTS

| | | |
|---|---|---|
| 717,451 | Great Britain | Oct. 27, 1954 |
| 65,753 | France | Nov. 9, 1955 |
| | (Addition to 1,044,339) | |

OTHER REFERENCES

Pecsok: Jour. Amer. Chem. Soc., vol. 75, page 2862, June 20, 1953.

Bull. 502 A, page 1, pub. by Metal Hydrides Inc., Beverly, Mass. Rec'd Feb. 15, 1950.

Jensen: A Study on Sod. Borohydride, pages 40–42, pub. by Nyt Nordisk Forlag Arnold Busch, Copenhagen (1954).